Dec. 30, 1958   V. MACKU   2,866,261
METHOD OF ERECTING SHEET PLATE CASINGS HAVING A CYLINDRICAL
SHAPE WITH VERTICAL AXIS, BY SHIFTING THE SHEET
PLATES ALONG A HELICAL LINE
Filed Sept. 19, 1956   5 Sheets-Sheet 1
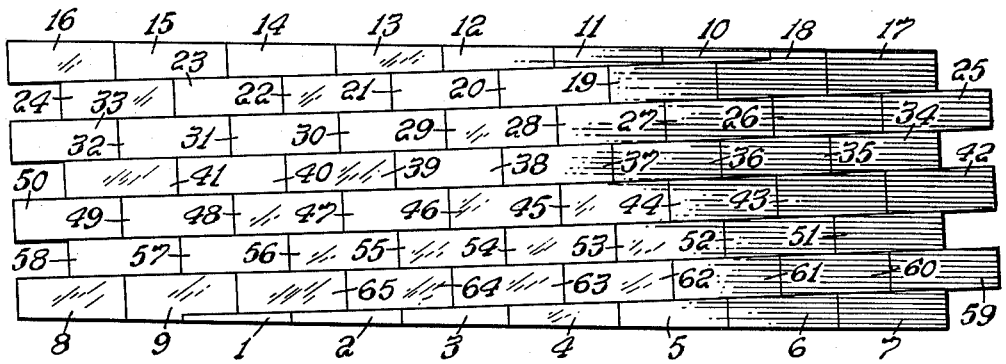
Fig. I
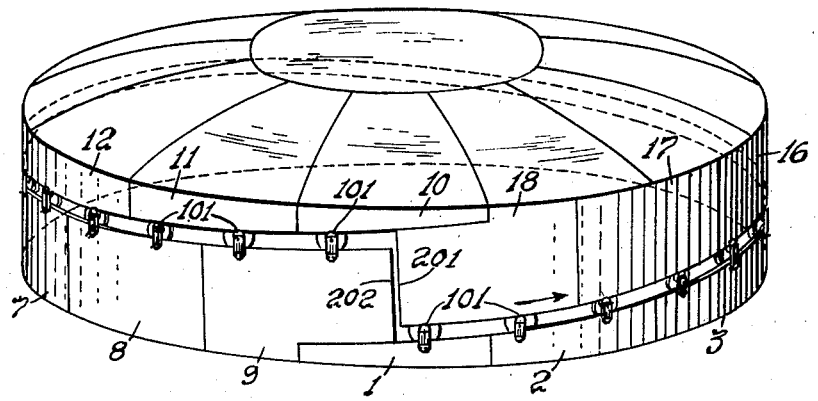
Fig. II
INVENTOR.
Vladimir Macku
BY Dec. 30, 1958 V. MACKU 2,866,261
METHOD OF ERECTING SHEET PLATE CASINGS HAVING A CYLINDRICAL
SHAPE WITH VERTICAL AXIS, BY SHIFTING THE SHEET
PLATES ALONG A HELICAL LINE
Filed Sept. 19, 1956 5 Sheets-Sheet 2
Fig. IIIa
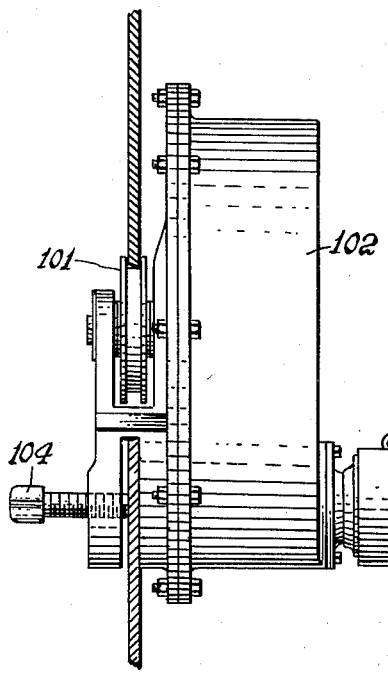
Fig. IIIb
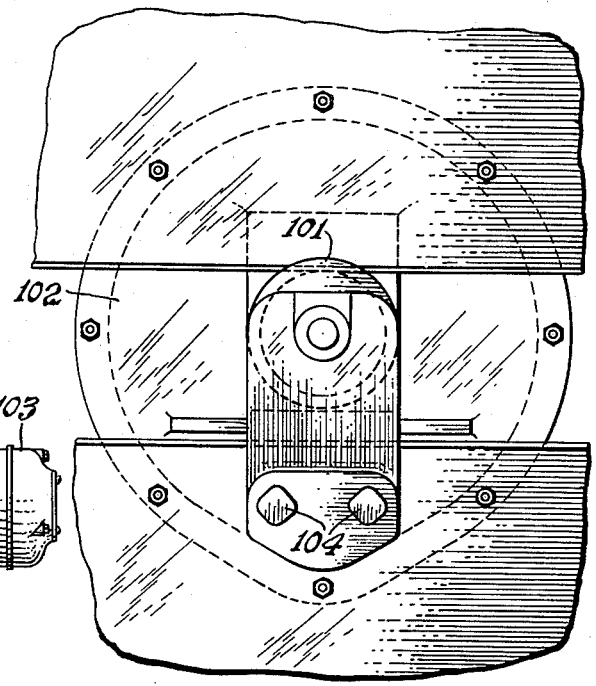
Fig. VIa
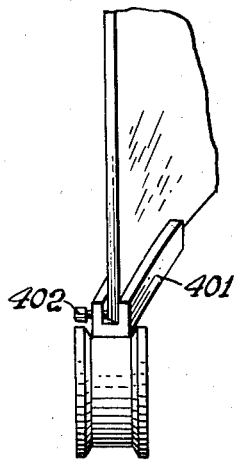
Fig. VIb
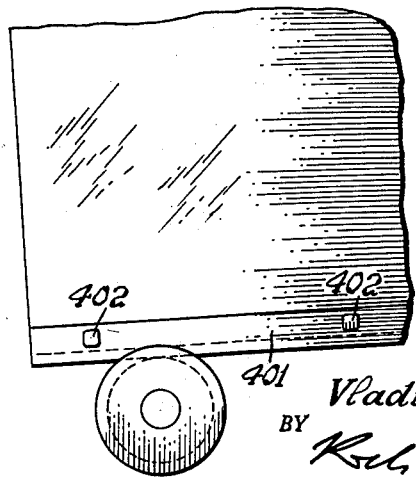
INVENTOR.
Vladimir Macku
BY Richard Lord Dec. 30, 1958 V. MACKU 2,866,261
METHOD OF ERECTING SHEET PLATE CASINGS HAVING A CYLINDRICAL
SHAPE WITH VERTICAL AXIS, BY SHIFTING THE SHEET
PLATES ALONG A HELICAL LINE
Filed Sept. 19, 1956 5 Sheets-Sheet 3
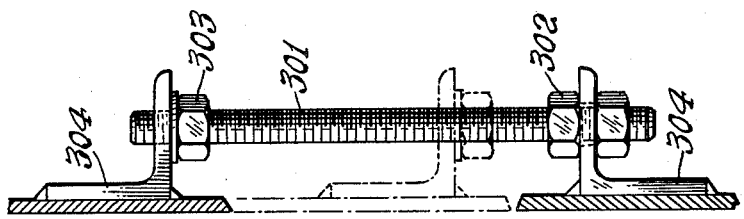
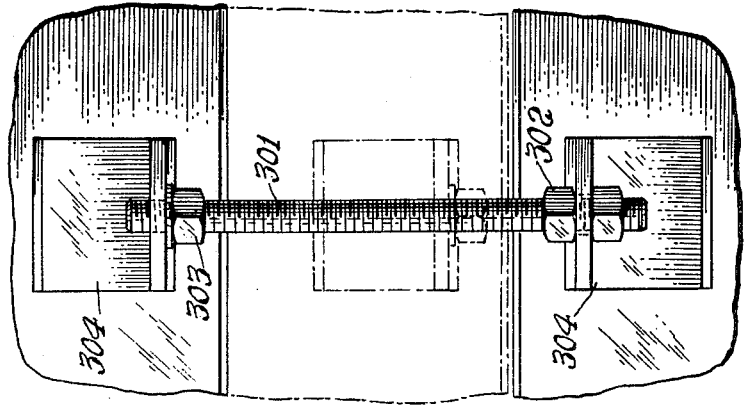
INVENTOR.
Vladimir Macku
BY

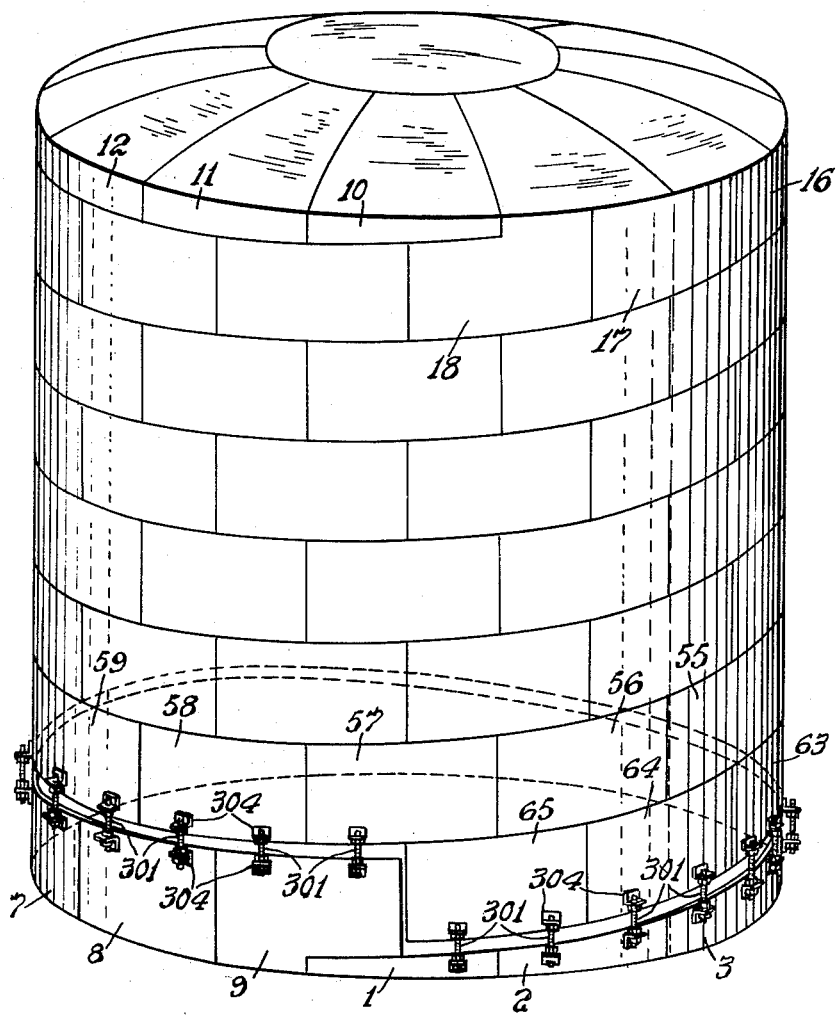

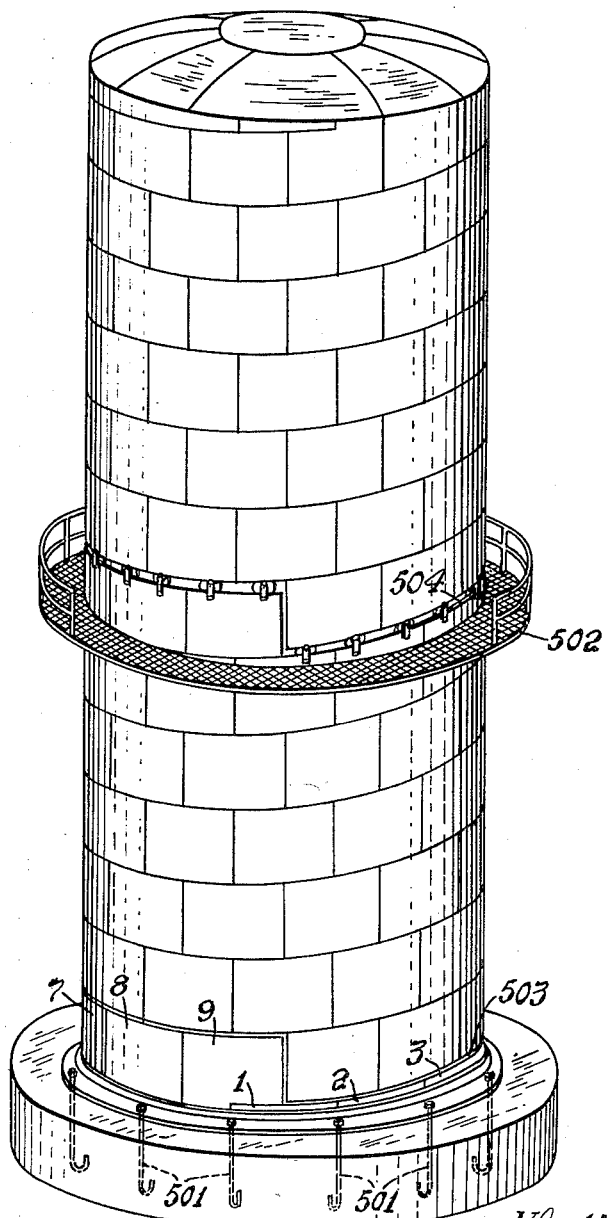

United States Patent Office 2,866,261
Patented Dec. 30, 1958

2,866,261

METHOD OF ERECTING SHEET PLATE CASINGS HAVING A CYLINDRICAL SHAPE WITH VERTICAL AXIS, BY SHIFTING THE SHEET PLATES ALONG A HELICAL LINE

Vladimir Macku, Brno, Czechoslovakia, assignor to Královopolská strojírna, Návod Klementa Gottwalda, národní podnik, Brno, Czechoslovakia Application September 19, 1956, Serial No. 610,839

5 Claims. (Cl. 29—429)

The present invention relates to a method of erecting cylindrical casings either of the type which are open at both the top and bottom ends or of the type which are closed by bottoms, such as, casings for storage tanks, gasholders, silos, and like.

The methods previously employed for erecting cylindrical casings or tanks of the described character have required the use of supporting fixtures, scaffolding, cranes or heavy jacks which, by reason of their complex construction, increased the cost and the time required for erection of the cylindrical casing or tank. Further, such accessories required for erecting the casing or tank posed transportation problems when the erection was to be effected in inaccessible locations.

Accordingly, it is an object of the present invention to provide a simple method of erecting cylindrical casings and tanks of the described character which requires the use of a minimum of erecting tools or accessories.

Another object is to provide a method of erecting cylindrical casings or tanks of the described character employing sheet plates to form the casing or tank so that the dimensions of such plates can be selected for convenience in transportation to the site.

A further object is to provide a method of erecting casings or tanks of the described character which is adapted for the employment of specialized skills, thereby to conveniently accelerate the speed of erection.

In accordance with an aspect of this invention, a tank or casing of the described character is formed of successive belts of sheet plates which are welded to each other along a helical line, the plates in such belts having a uniform vertical dimension, except in the uppermost and lowermost belts, wherein the respective plates are formed so as to define parallel, helical lower and upper edges, respectively. In erecting a cylindrical casing or tank in accordance with this invention, the plates of the lowermost belt are erected and welded together on a previously prepared base or foundation to define a helical upper edge along the erected lowermost belt. Then, pulleys or rollers are removably mounted directly upon the helical edge of the lowermost belt, and the plates of the uppermost belt are erected and secured together upon such pulleys or rollers with the latter supporting the lower helical edge of the uppermost belt. Thereafter, the upper portion of the tank or casing is intermittently turned, while being supported by the rollers or pulleys carried by the lowermost belt, to repeatedly open spaces between the lower edge of the upper part of the tank and the helical edge of the lowermost belt into which plates of the intermediate belts can be successively inserted for welding to the lower edge of the upper part of the tank and to the end edge of the adjacent plate in the same belt. Such intermittent turning of the upper part of the tank and the repeated insertion and securing of plates in the openings that are successively exposed moves the upper part of the tank progressively upward until a cylindrical tank or casing of the desired height has been erected. Then, screw fixtures are temporarily secured between the lower portion of the upper part of the tank and the lowermost belt resting on the base or foundation in order to support the upper part of the tank during the removal of the pulleys or rollers from the helical upper edge of the lowermost belt. Following the removal of the pulleys or rollers, the screw fixtures are manipulated to lower the upper part of the tank for closing the gap between the helical edges of the lowermost belt and of the last belt installed at the bottom of the upper part of the tank. When such gap has been closed, a welded seam is formed at the closed gap, and the screw fixtures can then be removed.

The above, and other objects, features and advantages of the invention, will be apparent in the following detailed description of illustrative embodiments of the invention, which is to be read in connection with the accompanying drawings, forming a part hereof, and wherein:

Fig. I is a developed view of a series of belts of sheet plates which may be used for the erection of a cylindrical tank or casing in accordance with the present invention;

Fig. II is a perspective view illustrating the initial stages of construction of a cylindrical tank or casing in accordance with this invention;

Figs. IIIa and IIIb are respectively a side elevational view, and a front elevational view, of a shifting pulley device suitable for use in connection with the present invention for the erection of a cylindrical tank or casing;

Fig. IV is a perspective view showing a tank or casing erected in accordance with the present invention at a stage of construction immediately prior to the completion thereof;

Figs. Va and Vb are respectively a front elevational view and a side elevational view of a screw fixture employed in accordance with the present invention for completing the erection of the tank shown in Fig. IV;

Figs. VIa and VIb are respectively an end elevational view and a partial front elevational view of a reenforcing element that may be used in erecting a tank in accordance with the present invention in order to avoid damage to the lower edges of the plates while riding upon the shifting pulley devices of Figs. IIIa and IIIb; and Fig. VII is a perspective view of a cylindrical tank or casing constructed in accordance with another embodiment of this invention, wherein the tank or casing is erected in two stages in order to avoid the overturning thereof by wind forces.

In erecting a tank in accordance with this invention, the plates are prepared for the flat bottom, the convex head and the shell. The plate sizes are such as to enable the shell to be assembled, as is indicated in Fig. I showing diagrammatically a developed shell. From Fig. I it is obvious that in the closed shell the bottom and top edges of the shell plates form helical lines unlike the shell belts heretofore used where those edges form closed circles. The plates of the shell are bent in the usual manner in a bending machine but are introduced therein in a position inclined by the angle of pitch of the helical line of the shell belts.

The bottom of the tank is first assembled, brought into position and welded together on the base and provided at its circumference with the necessary flanging and anchoring angle irons. Thereupon, the lowermost belt formed by the plates 1 to 9, Figs. I, II, is welded to the periphery of the bottom, the top edge of this belt forming the first turn of the helical line.

Following the erection of the lowermost belt, a number of shifting pulley devices are fixed to this top edge, Fig. III.

Each shifting pulley device (Figs. II and III) consists of an electrically driven pulley 101 rotatably carried by a body 102 wherein the necessary transmission gears are provided, a driving electric motor 103 and bolts 104 for fixing the pulley shifting device to the helical edge of the bottom shell belt formed by the plates 1 to 9. The electric motor is of the reversible type.

When all the pulley shifting devices have been mounted and fastened, their electric motors are connected to a joint change-over switch in such a way that the sense of rotation of all electric motors remains always the same.

On the helical pulley shifting track thus erected, the top belt of the shell of the future tank is built up from the plates 10 to 18 (Figs. I, II). Thereupon the convex head of the tank is assembled, if necessary on an auxiliary scaffolding, welded together and fixedly attached to the aforesaid top belt of the tank shell. After fixing the head, the pulley devices are put into operation by the change-over switch and move in a sense indicated by the arrows (Fig. II). The built-up top portion of the tank is thus turned about its vertical axis. The vertical edge 201 of the plate 18 (Fig. II) moves away from the vertical edge 203 of the plate 9 (Fig. II). The pulley shifting devices are operated until between the edges 201 and 202 the necessary gap occurs for inserting the plate 19 (Fig. I). The plate 19 is then inserted and secured to the plates 18, 10, 11 (Fig. II) and the top portion of the tank is again turned until the necessary gap is formed for inserting a further plate 20 (Fig. I). The plate 20 is brought into position and at the same time the plate 19 which had been shifted from its insertion place by a distance equal to its length, is welded-on by a continuous weld. This operation is repeated many times until the last plate 65 (Figs. I, IV) is welded-on and the tank attains the desired height (Fig. IV).

The gap of helical shape separating the top and the bottom portions of the tank from each other is bridged by a number of screw fixtures (Fig. IV).

Each of these fixtures (Fig. V) consists of a bolt 301 extending, at its opposite ends, through angle members 304 which are temporarily welded to the plates of the top and bottom parts of the tank (Fig. III). Nuts 304 are provided on the bolt 301 above and below the lower angle member 304, and a single nut 303 is provided on bolt 301 below the upper member 304.

Before welding on the screw fixtures, the nuts 303 are screwed up to a level enabling the top portion of the tank to rest thereon through the medium of the upper carrier elements 304. Thereby it is possible to release the pulley shifting devices after slackening the screws 104.

Thus, in turn, each of the pulley shifting devices is released, turned by 90° about the axis of the pulley and removed out of the gap.

After the removal of all the pulley shifting devices, and with the top portion of the tank resting merely on the screw fixtures, the nuts 303 are screwed down, thus lowering the top portion of the tank and narrowing the helical gap. Finally, when both portions of the tank are so close together that the aforesaid helical gap is reduced to a joint necessary for carrying out the welding operation, both portions of the tank are secured together by a continuous weld. Then the screw fixtures are removed by chiselling off the weld seams securing the angle member 304 to the related portions of the tank. Now the erection of the tank is roughly finished.

If a tank is to be erected with such a great ratio between height and diameter that the stability of the tank against wind forces cannot be guaranteed during the erection operations the erection operations are carried out in stages, as illustrated in Fig. VII.

To the mounted bottom of the tank the flanging and anchoring angle iron is welded-on as well as the first belt of the shell having a helical top edge and consisting of the plates 1 to 9. This belt is then anchored by means of anchor bolts 501 in the concrete base so as to ensure the stability of the tank to be erected. On the helical upper edge of this first belt of the shell the pulley shifting devices are mounted as above described. Unlike the building method previously described where first the topmost belt of the shell is mounted and welded together thus forming a circular edge, in this case a belt is built-up of rectangular plates with a helical upper edge. Then the plates are successively inserted and shifted by the pulley devices up to a level where a provisional assembly gallery 502, or a final gallery which can be used for the assembly operations, can be attached beneath its top helical edge. Then the shell is progressively erected in the manner previously described, until the gallery 502 is driven up to a level which is still safe from the viewpoint of stability against wind forces. Thereupon, the helical gap at the bottom of the erected shell is bridged by the screw fixtures, the pulley shifting devices are removed, the erected portion of the shell is lowered by the width of the gap so that the latter is narrowed to the joint necessary for welding, whereupon a continuous weld 503 is applied thereto and the screw fixtures are removed in the above described manner. Thus, the erection of the lower portion of the tank shell is finished, this portion having a helical top edge 504 and being secured by anchor bolts 501 against overturn by wind forces.

To this helical top edge 504 the pulley shifting devices are attached, the working posts are transferred to the gallery 502 and the erection operations are carried on. In this manner it is possible to erect either the last portion of the tank with the head thereon, if the building operation is to be carried out in two stages, or another piece of the shell, if the height of the tank requires the building operation to be performed in several stages, the head of the tank being attached thereto in the final stage.

In cases where particularly heavy tanks are to be erected so that the edges of the tank sections resting on the shifting pulley devices are liable to be plastically distorted, an attachment is used as shown in Fig. VI. The plates before being inserted on the pulley track are provided at their lower edge with protective ledges 401. These ledges are attached to the plates by screws 402 and are removed therefrom after the total length of each plate leaves the top part of the helical pulley track, and can be used again on other plates to be inserted.

The new building method according to the present invention presents the following advantages:

(1) There is no necessity for auxiliary labour connected with bringing the plates into position around the tank shell, as the plates are inserted at one point and can be brought into position with the help of a stationary hoist or directly from the transport means, (2) The welders always work at the same post or station, as the job is fed thereto, (3) Automatic welding machines can be used in a rational manner, as there is no need for displacing and moving the welding machines around the shell, and all welds can be made by means of a single welding machine, (4) The use of the automatic welding process enables the quality factor of the weld to be brought up to the value $v=1$ as against a factor of $v=0.7$ for hand welding, so that it is possible to reduce the thickness of the plates and thereby the total weight of the tank by up to 30 percent, (5) All building operations on tanks of conventional heights to be erected in a single stage, can be carried out without the necessity of erecting scaffoldings or fixtures extending from ground level, (6) The galleries, stairs or other accessories can be mounted likewise at ground level from a single working station, (7) There is no need for handling heavy jacks and no danger of the tank slipping off such jacks, (8) Since the tank shell is not built-up of individual closed belts the diameter of which has been determined by the length of the component plates, but consists of plates built-up along a helical line, the length of the plates does not influence the diameter of the tank shell and no deviations can occur between the individual belts and moreover there is no necessity of using narrow tolerances as to the length of the plates, (9) The progress of the work is easy and quick, as it has the character of a continuous production line where the jobs of all personnel are fully specialized,

(10) The working operations can be further accelerated by the arrangement of a double-thread helical line with twice the number of working stations resulting in twice the speed of building,

(11) As the line welds and the mantle lines of the tank shell enclose angles equal to the angle of pitch of the helical line of assembling, these welds are stressed by the inner overpressure of the tank to a lesser degree than welds lying in the direction of the mantle lines, and this makes it possible, in certain cases, to use thinner shell plates,

(12) The building of the tank in several stages, as in Fig. VII, makes it possible to erect tanks of abnormal height, the erecting of which in the conventional way with the aid of jacks would be impracticable in view of the necessity of obtaining the required stability against overturning by wind forces, while other known building methods would require expensive scaffoldings and lifting apparatus,

(13) The tanks can be erected close to each other, even so close that the shells touch each other, as is required in the case of tanks to be protected by a concrete casing.

I claim:

1. A method of erecting a vertically extending cylindrical shell, comprising the steps of providing two parts of the shell each consisting of plates of continuously increasing height secured to each other in end-to-end relationship so that both of said parts together define a cylindrical section divided by a slot in the form of one turn of a helix, movably supporting the upper one of said parts on the edge of the lower of said parts at said slot, turning said upper part relative to said lower part in the direction of the pitch of said helix so that a gap opens in said slot at the beginning of said turn of the helix, inserting a plate of uniform height in said gap and securing the inserted plate to the adjacent plates of said upper part for including the inserted plate in the latter, repeating the turning of said upper part and the inserting and securing of plates in the gaps which are thus successively opened until a shell of the desired height is obtained, and then securing together the confronting edges of said upper and lower parts at said slot.

2. A method of erecting a vertically extending cylindrical shell as in claim 1; wherein said upper part is movably supported by removably securing pulleys to said lower part at spaced apart locations along the upper edge of the latter so that the lower edge of said upper part rides on said pulleys.

3. A method of erecting a vertically extending cylindrical shell as in claim 2; further comprising the steps of securing removable strips to the plates of said upper part along said lower edge of the latter to provide an increased bearing surface for riding on said pulleys, removing the strip from the lower edge of each plate of said upper part as the related part arrives over a gap opened to receive a plate so that the inserted plate can be secured to the plate thereabove, and applying a removable strip to the lower edge of each inserted plate.

4. A method of erecting a vertically extending cylindrical shell as in claim 2; further comprising the steps of rotatably driving at least one of said pulleys to effect said turning of the upper part relative to the lower part.

5. A method of erecting a vertically extending cylindrical shell as in claim 2; further comprising the steps of supporting said upper part on the lower part independently of said pulleys when a shell of the desired height has been obtained, removing said pulleys from the lower part, and lowering said upper part onto said lower part so that said securing together of the confronting edges at said slot can be effected by welding along the latter.

References Cited in the file of this patent

UNITED STATES PATENTS 2,751,672    Reed _____ June 26, 1956

FOREIGN PATENTS 617,835    France _____ Feb. 26, 1927